United States Patent [19]

Kitamura et al.

[11] Patent Number: 4,932,438
[45] Date of Patent: Jun. 12, 1990

[54] VALVE PROVIDED WITH VALVE BODIES MADE OF A CERAMIC COMPOUND

[75] Inventors: Kazuhiro Kitamura, Gifu; Kiyotaka Tsukada, Nagoya, both of Japan

[73] Assignees: Kitamura Valve Co., Ltd, Gifu; Ibiden Co., Ltd., Ogaki, both of Japan

[21] Appl. No.: 349,988

[22] Filed: May 8, 1989

Related U.S. Application Data

[63] Continuation of Ser. No. 935,232, filed as PCT JP86/00125 on Mar. 12, 1986, published as WO86/05482 on Sep. 25, 1986, abandoned.

[30] Foreign Application Priority Data

Mar. 12, 1985 [JP] Japan .............................. 48968/1985
Apr. 19, 1985 [JP] Japan .............................. 85096/1985

[51] Int. Cl.$^5$ .............................................. E03B 1/00
[52] U.S. Cl. ............................ 137/625.17; 251/368; 29/890.12
[58] Field of Search ................ 29/157.1 R; 251/368; 137/625.17, 625.41

[56] References Cited

U.S. PATENT DOCUMENTS

| | | | |
|---|---|---|---|
| 3,592,440 | 7/1971 | McFarland | 251/368 |
| 3,873,344 | 3/1975 | Church et al. | 65/60.5 |
| 3,917,149 | 11/1975 | Breton et al. | 29/420.5 |
| 4,088,153 | 5/1978 | Paasikivi | 137/625.17 |
| 4,377,892 | 3/1983 | Gonzalez | 251/368 |
| 4,420,142 | 12/1983 | Dworak et al. | 251/368 |
| 4,560,526 | 12/1985 | Okumura | 501/88 |

FOREIGN PATENT DOCUMENTS 29288 9/1979 Japan .
118080 7/1982 Japan .
232981 12/1984 Japan .

Primary Examiner—A. Michael Chambers
Attorney, Agent, or Firm—Lorusso & Loud

[57] ABSTRACT

In a valve provided with a fixed valve body (13) forming a passage of a fluid and a movable valve body (14) arranged relatively movably in contact with this fixed valve body (13), in order to smooth the sliding between the fixed valve body (13) and movable valve body (14) over a long period, the sliding surface part of at least either of the above mentioned fixed valve body (13) and movable valve body (14) is formed of a ceramic compound charged with a lubricant in the open pores of a sintered ceramic body having open pores of a three-dimensional network structure. Thereby, the fluid passage can be connected and disconnected always lightly and stably by the operation of an operating lever (17) and the sliding of the fixed valve body (13) and movable valve body (14) in close contact with each other can be maintained over a long period to prevent the fluid from leaking out.

10 Claims, 3 Drawing Sheets

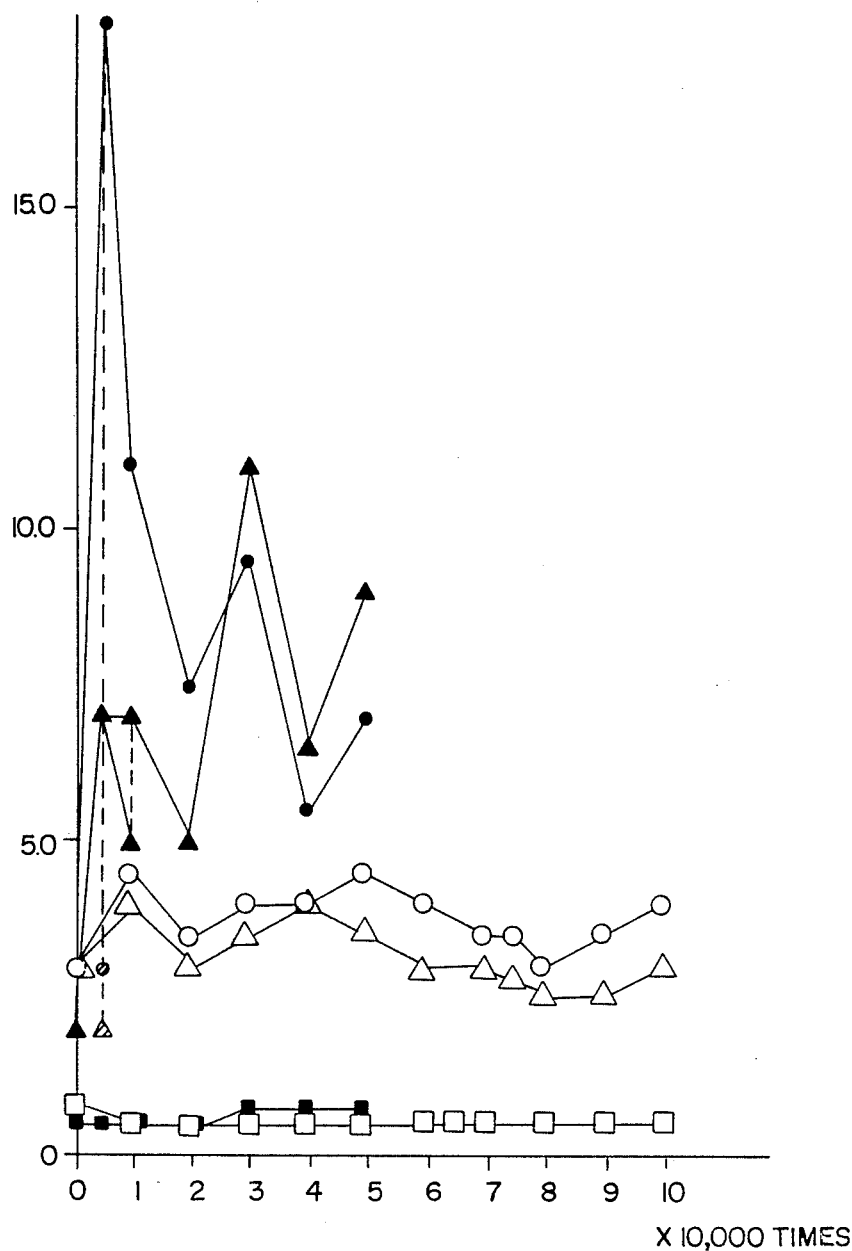

FIG.4

SLIDING TORQUE FLUCTUATION

SiC (FIXED SIDE) – $Al_2O_3$ (MOVABLE SIDE)
- (d) ─○──○─ CENTRAL MIXED POSITION  FEEDING-WATER—STOPPING-WATER
- (e) ─△──△─ FEEDING-WATER POSITION  HOT WATER SIDE—COLD WATER SIDE
- (f) ─□──□─ STOPPING-WATER POSITION HOT WATER SIDE—COLD WATER SIDE $Al_2O_3$ (FIXED SIDE) – $Al_2O_3$ (MOVABLE SIDE)
- (a) ─●──●─ CENTRAL MIXED POSITION  FEEDING-WATER—STOPPING-WATER
- (b) ─▲──▲─ FEEDING-WATER POSITION  HOT WATER SIDE-COLD WATER SIDE
- (c) ─■──■─ STOPPING-WATER POSITION HOT WATER SIDE-COLD WATER SIDE

X 10,000 TIMES

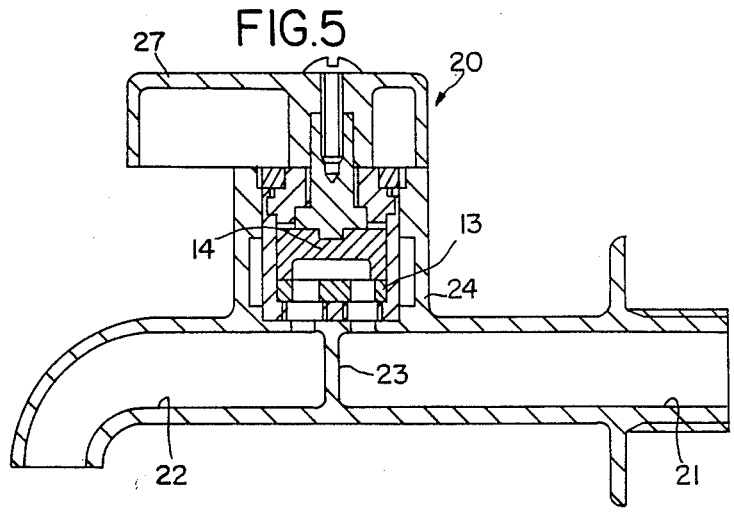
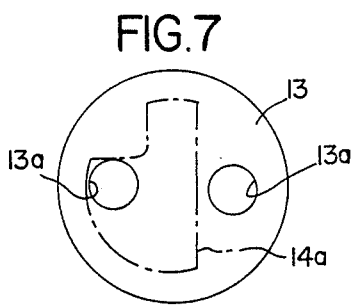
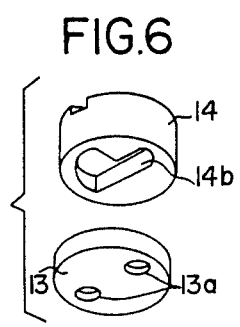
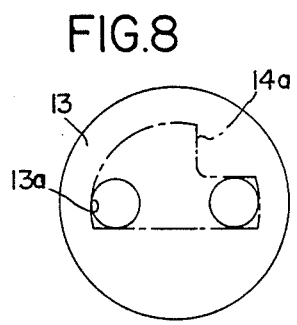
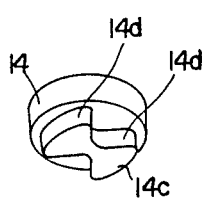
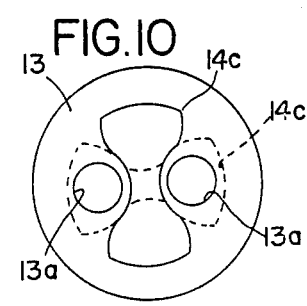

VALVE PROVIDED WITH VALVE BODIES MADE OF A CERAMIC COMPOUND

This is a continuation of co-pending application Ser. No. 06/935,232 filed as PCT JP86/00125 on Mar. 12, 1986, published as WO86/05482 on Sep. 25, 1986, now abandoned.

TECHNICAL FIELD

This invention relates to valves provided with valve bodies made of a ceramic compound for connecting and disconnecting a passage of a fluid and more particularly to a valve provided with valve bodies made of a ceramic compound charged with a lubricant in the open pores of a porous sintered ceramic body.

BACKGROUND TECHNIQUE

There have been already suggested many valves wherein, by operating an operating lever, a movable valve body is moved relatively in sliding contact with a fixed valve body contained in a main valve body to connect or disconnect a passage of a fluid or, in other words, to control the valve to be opened, closed, switched, adjusted or used to mix fluids.

Now, for this kind of valve, there are such various requirements as in the following:

(1) Even though the movable valve body is always in sliding contact with the fixed valve body, the movable valve body should be lightly operated by the operating lever.

(2) The operation by the operating lever should be able to be maintained to be light for a long period.

(3) The maintenance service of each valve body should be simple and, if possible, should not be required at all.

(4) As a matter of course, the sealing between the respective valve bodies should not vary and the fluid should not leak out even in a long use.

(5) The respective valve bodies should be simple to make.

In such various already suggested valves for fluids as, for example, valves for mixing hot water and cold water with each other, in consideration of the wear resistance between the respective valve bodies, the respective valve bodies have been often formed of such comparatively hard material as a metal or sintered aluminum oxide so as to be compact. However, if so formed, the respective valve bodies will improve in the wear resistance but will not smoothly slide between them and, as shown in FIG. 4, the sliding torque applied to the operating lever of the valve for mixing hot water and cold water will be considerably large in the initial period.

Therefore, in order to smooth such sliding, the respective valve bodies are painted with a lubricant on the surfaces.

However, the lubricant applied to paint the surface is so likely to flow out that, in the case of a long use, it will be difficult to maintain the initial operation characteristic.

Thus, ceramics themselves have a high hardness and are high in the wear resistance but are generally poor in the self-lubricatability. Ceramics have not yet been suggested as materials solving it and applicable to valves.

The present invention is made in view of such fact as in the above and its object is to provide a valve wherein, even in the case of a long use, the fluid can be always lightly and stably connected or disconnected by the operating lever.

DISCLOSURE OF THE INVENTIION

The present invention shall be explained in detail in the following.

According to a valve provided with valve bodies made of a ceramic compound in the present invention, in a valve provided with a fixed valve body forming a passage of a fluid and a movable valve body relatively movable in contact with the above mentioned fixed valve body, the sliding surface part of at least either of the above mentioned fixed valve body and movable valve body is formed of a ceramic compound charged with a lubricant in the open pores of a sintered ceramic body having open pores of a three-dimensional network structure.

Now, the ceramic compound of the present invention can be made by a process wherein a ceramic powder which is a starting material is formed to be of a produced form of any shape, is bonded to be a porous ceramic body without closing the pores present in the produced form and is then charged with a lubricant in the open pores of the above mentioned porous ceramic body.

For the process wherein the above mentioned ceramic powder is formed to be of a produced form of any shape and is bonded without closing the pores present in the produced form, there can be applied such various methods as, for example, a method wherein a ceramic powder itself is sintered under the normal pressure or an added pressure to be self-sintered, a method wherein a ceramic powder is made to react to be sintered by adding a substance producing ceramics by reaction, a method wherein a ceramic powder is mixed with such metal as Co, Ni or Mo or such binder as a glass cement and is sintered under the normal pressure or an added pressure to be bonded and a method wherein a ceramic powder is mixed with such binder as a thermosetting resin or thermoplastic resin so as to be bonded.

It is advantageous for the above mentioned sintered ceramic body that the rate of the open pores is 5 to 40% by volume, because, if the above mentioned rate of the open pores is lower than 5% by volume, the substantial charge of the lubricant will be so low that it will be difficult to sufficiently develop the lubricating characteristic and, on the other hand, if it is higher than 40% by volume, the sintered body will be low in the strength and durability.

It is advantageous that the average granule diameter of the crystals of the above mentioned sintered ceramic body is less than 10 $\mu$m, because, if the average granule diameter of the above mentioned crystals is larger than 10 $\mu$m, the coarseness of the surface of the sintered body will be likely to be so large as to reduce the sliding characteristic.

It is advantageous that the average granule diameter of the ceramic powder which is the above mentioned starting material is less than 10 $\mu$m, because, if a ceramic powder of an average granule diameter larger than 10 $\mu$m is used, the bonding parts between the granules will be so few that not only it will be difficult to produce a sintered body of a high strength but also the surface coarseness will deteriorate.

For the lubricant with which the above mentioned sintered ceramic body is to be charged, there can be used any of a resin having a lubricating property, fluorine type oil, silicone type oil and lubricating oil.

For the above mentioned resin having a lubricating property, there can be used any one or mixture of more resins selected from among a polyacetal resin, polyamide resin, polyethylene resin, polycarbonate resin, polybutylene terephthalate resin, styrene acrylonitrile resin, polypropylene resin, polyurethane resin, polyphenylene sulfide resin, epoxy resin, silicone resin and fluorine resin.

For the above mentioned fluorine type oil, it is advantageous to use any one or mixture of more selected from among fluoroethylene, fluoroester, fluorotriazine, perfluoropolyether, fluorosilicone, their derivatives and polymers. For the above mentioned silicone type oil, it is advantageous to use any one or mixture of more selected from among methyl silicone, methylphenyl silicone, their derivatives and polymers. By the way, the above mentioned fluorine type oil and silicone type oil can be used in the form of any of a liquid, grease and wax.

By the way, the above mentioned fluorine type oil and silicone type oil are so high in the solventproofness, chemical stability and heatproofness as to be able to give a very high lubricating characteristic over a long time.

According to the present invention, it is advantageous to impregnate or charge 100 parts by volume of the open pores of the above mentioned sintered ceramic body with at least 10 parts by volume of the lubricant, because, if the impregnation or charge with the lubricant is less than 10 parts by volume, it will be difficult to substantially develop the lubricating effect.

For the process of impregnating or charging the open pores of the above mentioned sintered ceramic body with a lubricant, there can be applied a method wherein the sintered ceramic body is dipped in the lubricant heated to be melted or reduced in the viscosity in a vacuum or under an added pressure, a method wherein it is dipped in the lubricant dissolved by a solvent, a method wherein it is impregnated as a monomer and is then converted to a polymer and a method wherein a fine granulated lubricant is dispersed in a dispersing medium liquid and the sintered ceramic body is dipped in the dispersion to be impregnated and is then baked.

The valve according to the present invention is formed as mentioned above and therefore has such operation as is mentioned in the following.

First of all, as the sliding surface part of at least either of the fixed valve body and movable valve body is formed of a porous sintered ceramic body, this sintered ceramic body itself is so high in the hardness and wear resistance that these fixed valve body and movable valve body are high in the wear resistance.

Also, as the sliding surface part of at least either of the fixed valve body and movable valve body is formed of a sintered ceramic body having open pores of a three-dimensional network structure and the open pores are charged with a lubricant, the fixed valve body and movable valve body are in smooth sliding contact with each other due to the lubricating property of this lubricant.

In case the above mentioned fixed valve body or movable valve body was formed of a sintered silicon carbide body and these valve bodies were combined within a plug for mixing hot water and cold water, the actual lubricating characteristics were as in FIG. 4 when considered from the experiment results. In these experiments, the lubricating property on the sliding contact surface of the fixed valve body and movable valve body was detected by measuring the sliding torque fluctuation in the operating lever of the plug for mixing hot water and cold water. According to these experiments, even when the operating lever was moved 100,000 times, the sliging torque (d and e in FIG. 4) was always below 5 kg cm and the sliding torque fluctuation range was below 2 to 2.5 kg cm. That is to say, as compared with the sliding torque fluctuation (a and b in FIG. 4) of the operating lever in the conventional hot water and cold water mixing plug, in case the valve bodies according to the present invention are used, the sliding torque applied to the operating lever not only will be small but also will little fluctuate even if the lever is used over a long time.

Needless to say, the above is the same with such fluids as such liquids as oils, washing liquids and solvents and various gases.

Even in case such other sintered ceramic body as a sintered body containing mostly one or more selected from among $Al_2O_3$, $SiO_2$, $ZrO_2$, SiC, TiC, TaC, $B_4C$, WC, $Cr_3C_2$, $Si_3N_4$, BN, TiN, AlN, $TiB_2$, $CrB_2$ and their compounds is used in place of the above mentioned sintered silicon carbide body, substantially the same operation as the above mentioned operation will be obtained.

In such valve, as the fixed valve body or movable valve body itself contains a lubricant having a lubricating property, such maintenance service as of painting each valve body with a lubricant as in the past is not required at all.

BRIEF EXPLANATION OF THE DRAWINGS

FIG. 4 is a graph showing the sliding torque fluctuation between the fixed valve body and movable valve body according to the present invention and between the conventional fixed valve body and movable valve body as compared with each other.

FIGS. 5 to 10 show the present invention as applied to a single water plug.

FIG. 5 is a vertically sectioned view of this single water plug.

FIG. 6 is a perspective view of the fixed valve body and movable valve body.

FIGS. 7 and 8 are plan views showing the relation between the fixed valve body and movable valve body.

FIG. 9 is a perspective view showing further another embodiment of the movable valve body.

FIG. 10 is a plan view showing the relation between the fixed valve body and movable valve body.

BEST FORM FOR EMBODYING THE INVENTION

Figure 1:
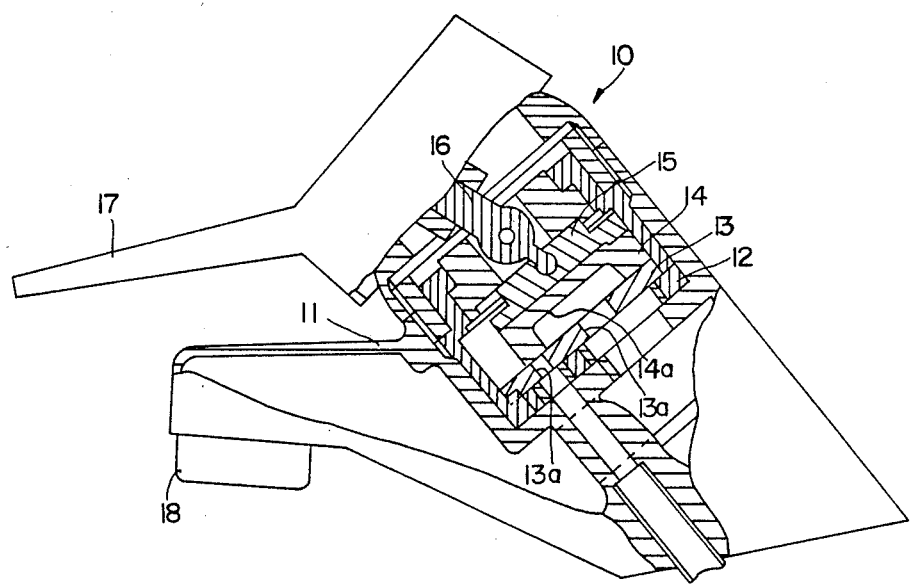
FIG. 1 is a vertically sectioned view of a hot water and cold water mixing plug embodying the present invention.

An example of the valve according to the present invention as applied to a fixed valve body 13 or movable valve body 14 in a plug 10 for mixing hot water and cold water shall be explained with reference to the drawings. A vertically sectioned view of the hot water and cold water mixing plug 10 is shown in FIG. 1. This hot water and cold water mixing plug is to lead cold water or hot water fed to it out of a faucet 18 as alone or properly mixed.

A supporting member 12 is contained within a main valve body 11 of this plug 10, a fixed valve body 13 is arranged as fixed on this supporting member 12 and further a movable valve body 14 is arranged on this fixed valve body 13. A connecting member 15 is fixed to the upper part of the movable valve body 14 so that, when an actuating lever 16 engaged with this connecting member 15 is moved by an operating lever 17, the movable valve body 14 will be able to be slid forward, rearward, rightward and leftward in close contact with the fixed valve body 13. Needless to say, the above mentioned supporting member 12 with the fixed valve body 13 and the movable valve body 14 with the connecting member 15 may be respectively integrally formed in the embodiment. In such case, the sliding contact surface part of these integral formations may be formed of a porous sintered ceramic body having open pores of a three-dimensional network structure as described later and by charging the open pores with a lubricant.

Figure 2:
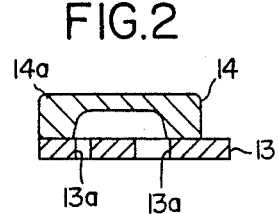
FIG. 2 is a vertically sectioned view showing the relation between a fixed valve body and movable valve body.
Figure 3:
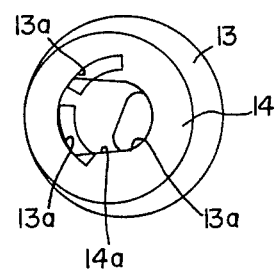
FIG. 3 is a perspective plan view of FIG. 2 as seen from above.

The fixed valve body 13 and movable valve body 14 are as shown in FIGS. 2 and 3 and have respectively one or more passages 13a or 14a formed therein. The number and positions of these passages 13a and 14a are so set that, when the movable valve body 14 is moved in sliding contact with the fixed valve body 13 by the operation of the operating lever cold water and hot water may be selectively mixed. Needless to say, these passages 13a and 14a may be through holes or mere recesses.

In FIG. 5 is shown a vertically sectioned view of a single water plug 20 in which the fixed valve body 13 and movable valve body 14 according to the present invention are used. In this single water plug 20, the fixed valve body 13 is arranged through a packing above a partition wall 23 between a primary side passage 21 and secondary side passage 22 of water and further the movable valve body 14 is arranged on the fixed valve body 13. This movable valve body 14 is to be rotated in close contact with the fixed valve body 13 by the operation of an operating lever 27 provided on a main valve body 24 of the single water plug 20 and has on the lower surface a recess 14b for selectively connecting or disconnecting a pair of passages 13a of the fixed valve body 13 as shown in FIG. 6. That is to say, in case the recess 14b is in such position relation as is shown in FIG. 17 with respect to the respective passages 13a of the fixed valve body 13, the primary side passage 21 and secondary side passage 22 will be able to be disconnected with each other and, in case the recess 14b is in such position relation as is shown in FIG. 8, the primary side passage 21 and secondary side passage 22 will be able to be connected with each other.

By the way, as shown in FIG. 9, a disconnecting projection 14c which can cover the respective passages 13a of the fixed valve body 13 may be formed on the lower surface of the movable valve body 14 to form a passage 14d around it so that, when this disconnecting projection 14c is in such position relation as is shown by the solid line in FIG. 10 with respect to the respective passages 13a, the primary side passage 21 and secondary side passage 22 may be connected with each other but, when the disconnecting projection 14c is in the position relation shown by the imaginary line in FIG. 10, the primary side passage 21 and secondary side passage 22 may be disconnected with each other.

The sliding contact surface part of at least either of such fixed valve body 13 and movable valve body 14 as are explained above is formed of a porous sintered ceramic body having open pores of a three-dimensional network structure and the above mentioned open pores are charged with a lubricant.

Also, according to the present invention, in the case of charging the pores of the porous body with the above mentioned lubricant, if the pores are charged with the lubricant as mixed with such powder as of molybdenum bisulfide, tungsten bisulfide, molybdenum selenide, tungsten selenide or boron nitride, the sliding characteristic will be able to be further improved.

Examples and a control of actually making the respective fixed valve body 13 and movable valve body 14 mostly of silicon carbide as ceramics shall be explained in the following:

EXAMPLE 1

The silicon carbide powder used as a starting material consisted of 94.6% by weight of $\beta$ type crystals, contained mostly 0.29% by weight free carbon, 0.17% by weight oxygen, 0.03% by weight iron and 0.03% by weight aluminum, had an average granule diameter of 0.28 $\mu$m and had no boron detected. 100 parts by weight of the silicon carbide powder were blended with 5 parts by weight of polyvinyl alcohol and 300 parts by weight of water, were mixed for 5 hours in a ball mill and were then dried.

A proper amount of this dried mixture was taken out, was granulated and was then molded under a pressure of 3000 kg/cm$^2$ by using a pressing die made of a metal. This produced molding was of dimensions of 50 mm$\times$50 mm$\times$30 mm and a density of 2.0 g/cm$^3$ (62% by volume).

The above mentioned produced molding was put into a crucible made of graphite and was fired in an atmosphere mostly of argon gas under 1 atmosphere by using a Tammam type furnace. In the temperature elevating process, first the temperature was elevated to 2000° C. at 450° C./hour and the maximum temperature of 2000° C. was maintained for 10 minutes. The partial pressure of the CO gas during the sintering was controlled to be less than 80 Pa at the normal temperature to 1700° C. and to be within the range of 300$\pm$50 Pa in the temperature range higher than 1700° C. by properly adjusting the flow of the argon gas.

The obtained sintered body was of a density of 2.05 g/cm$^3$ and an open porosity of 36% by volume. Its crystal structure was observed with a scanning type electronic microscope to have a three-dimensional network structure in which silicon carbide crystals of an average aspect ratio of 2.5 were complicatedly entangled in many directions. The linear shrinkage for the produced molding was within a range of 0.25$\pm$0.02%. The sintered body was of a dimension precision within $\pm$0.05 mm and of an average bending strength showing a very high value of 18.5 kg/mm$^2$.

This sintered body was made to be in the form of a ring of an outside diameter of 30 mm, inside diameter of 15 mm and thickness of 5 mm, was then dipped under a vacuum into suspension water in which 60% by weight of fine granules of polytetrafluoroethylene of an average granule diameter of 0.26 $\mu$m was dispersed so as to be impregnated and was then baked at a temperature of 380° to 400° C. to obtain a compound. The rate of the air gaps of the sintered body occupied by the polytetrafluoroethylene with which the compound was charged was 50.1% by volume.

When dry sliding of this compound on a stainless steel (SUS304) was tested under an end surface load of 10 kg/cm$^2$ by a ring-on-ring method at a sliding velocity of 500 mm/sec, the friction coefficient was 0.15 to 0.22 and the wear coefficient was $3.1 \times 10^{-4}$ mm/km (kg/cm$^2$) and it was recognized to have a very high sliding characteristic.

Control 1

When the porous sintered silicon carbide body was the same as in Example 1 but no polytetrafluoroethylene was compounded and the sliding was tested, the friction coefficient was 0.5 to 0.7 and the wear coefficient was $2.3 \times 10^{-1}$ mm/km (kg/cm$^2$).

EXAMPLE 2

The process for producing the porous sintered silicon carbide body was substantially the same as in Example 1 but the molding pressure was changed to 40 kg/cm$^2$ to obtain a sintered body.

The obtained sintered body was of a density of 1.76 g/cm$^3$ and an open porosity of 55% by volume. The linear shrinkage of the produced molding was within a range of 0.36±0.03% in any direction. The dimensional precision of the sintered body was within ±0.08 mm. The average bending strength of this sintered body was so high as to be 720 kg/cm$^2$.

Then this sintered body was made to be in the form of a ring of an outside diameter of 30 mm, inside diameter of 15 mm and thickness of 5 mm and was then impregnated with a heated and molten polyacetal resin to obtain a compound. The rate of the air gaps of the sintered body occupied by the polyacetal resin with which this compound was charged was 98% by volume.

When the sliding characteristic of this compound was measured by the same method as in Example 1, the friction coefficient was 0.18 to 0.25 and the wear coefficient was $6.2 \times 10^{-4}$ mm/km (kg/cm$^2$). It was recognized to have a sliding characteristic about 370 times as high as in the above mentioned Control 1.

EXAMPLE 3

The porous sintered silicon carbide body was the same as in Example 1 but was impregnated with each of a heated and molten polyamide resin, polyethylene resin, polycarbonate resin, polybutylene terephthalate resin and epoxy resin to obtain compounds.

Any of the obtained compounds was recognized to have a high sliding characteristic.

EXAMPLE 4

The porous sintered silicon carbide body was the same as in Example 1 but was impregnated with each of a styrene acrylonitrile resin, polyphenylene sulfide resin and silicone resin as dissolove in benzene to obtain compounds. Any of the obtained compounds was recognized to have a high sliding characteristic.

EXAMPLE 5

In the same method as in Example 1, a dried material prepared by mixing 1 part by weight of a boron carbide powder and 2 parts by weight of a carbon black powder with 100 parts by weight of a silicon carbide was used and the firing temperature was reduced to 1900° C. to obtain a sintered body.

In the obtained sintered body, the crystals were of an average granule diameter of about 2.7 μm and were bonded in a three-dimensional network structure, the density was 2.86 g/cm$^3$ and the average bending strength was 52 kg/mm$^2$.

EXAMPLE 6

In the same as in Example 1, a mixed powder of an α type silicon carbide powder of an average granule diameter of about 38 μm and a purity higher than 99.3% by weight and an α type silicon carbide powder of an average granule diameter of about 0.8 μm and a purity higher than 99% by weight was used in place of the β type silicon carbide powder of an average granule diameter of about 2.8 μm and the firing temperature was elevated to 2300° C. to obtain a sintered body. In the obtained sintered body, the crystals were bonded in a three-dimensional network structure, the density was 2.76 g/cm$^3$ and the average bending strength was 17.8 kg/mm$^2$.

Each of the sintered bodies of Examples 5 and 6 was made to be in the form of the fixed valve body 13 or movable valve body 14 and was then charged with polyethylene in 80 to 85% by volume of the air gaps the same as in Example 2. When the sliding of the thus made fixed valve body 13 or movable valve body 14 was tested, it was confirmed that the fixed valve body 13 or movable valve body 14 had a very high sliding characteristic even when not lubricated and had a very high durability.

EXAMPLE 7

The same porous sintered silicon carbide body as in Example 1 was impregnated with perfluoropolyether under a vacuum. The rate of the open pores occupied by the perfluoropolyether with which this porous sintered silicon carbide body was impregnated was 90% by volume.

When the dry sliding of the ceramic compound impregnated with this perfluoropolyether on a stainless steel (SUS304) was tested by the same method as in Example 1, the friction coefficient was 0.05 to 0.10 and the wear coefficient was $2.1 \times 10^{-4}$ mm/km (kg/cm$^2$). It was recognized to have a very high sliding characteristic.

EXAMPLE 8

In the same as in Example 7, the porous sintered silicon carbide body was impregnated with methylphenyl silicone in place of the perfluoropolyether. The rate of the open pores occupied by the methylphenyl silicone with which this porous sintered silicon carbide was impregnated was about 90% by volume.

When the sliding characteristic of this ceramic compound was measured by the same method as in Example 1, the friction coefficient was 0.15 to 0.25 and the wear coefficient was $4.7 \times 10^{-4}$ mm/km (kg/cm$^2$). It was recognized to have a wear resistance about 490 times as high as in the above mentioned Control 1.

EXAMPLE 9

In the same as in Example 7, the porous body was impregnated with each of fluoroethylene, fluoroester, fluorotriazine, fluorosilicone, methylsilicone and fluoropropylmethylsilicone.

The porous body impregnated with any of the above mentioned lubricants was recognized to have a high sliding characteristic.

The following is to explain the case of firing each sintered body by using another ceramic material than silicon carbide.

EXAMPLE 10

100 parts by weight of an α type alumina powder of an average granule diameter of 0.4 μm were mixed with 2 parts by weight of polyvinyl alcohol, 1 part by weight of polyethylene glycol, 0.5 part by weight of stearic acid and 100 parts by weight of water and were sprayed and dried.

A proper amount of this dried material was taken, was molded under a pressure of 1.5 tons/cm² by using a pressing die made of a metal to obtain a produced molding of a diameter of 50 mm, thickness of 20 mm and density of 2.3 g/cm³ (59% by volume).

The above mentioned produced molding was put into a crucible made of alumina and was fired for 1 hour in air under the atmospheric pressure at a temperature of 1300° C. which was in a temperature range in which more than 5% by weight of a liquid phase was produced in sintering.

The crystals of the obtained sintered body were of an average granule diameter of 2.4 μm, were bonded in a three-dimensional network structure and were of a density of 2.3 g/cm³ and an average bending strength of 6.7 kg/mm².

This sintered body was formed to be in the form of the fixed valve body 13 or movable valve body 14, was then dipped and impregnated under a vacuum with suspension water in which fine granules of polytetrafluoroethylene of an average granule diameter of 0.26 μm had been dispersed and was then baked at a temperature of 300° to 400° C. to obtain a compound.

The rate of the air gaps of the porous body occupied by the polytetrafluoroethylene with which this compound was charged was about 62% by volume.

When the dry sliding of this compound on a stainless steel (SUS304) was tested under an end surface load of 10 kg/cm² by a ring-on-ring sliding method at a sliding velocity of 500 mm/sec, the friction coefficient was 0.16 to 0.23 and the wear coefficient was $3.7 \times 10^{-4}$ mm/km (kg/cm²). It was recognized to have a very high sliding characteristic.

EXAMPLE 11

In the same as in Example 10, each of ceramic powders shown in Table 1 was used in place of the α type alumina powder and was sintered in a temperature range in which the amount of a liquid phase produced in sintering was within the range of 3 to 5% by weight to obtain a sintered body.

The obtained sintered body had a three-dimensional network structure.

The obtained sintered body was charged with polytetrafluoroehylene the same as in Example 7 to obtain a compound. Then the dry sliding of this compound on a stainless steel (SUS304) was tested the same as in Example 7. The results are shown in Table 1.

These compounds had very favorable characteristics even when impregnated with no lubricant and were confirmed to be very high also in the durability.

TABLE 1

| Example | Average granule diameter of powder in μm | Chemical composition in % by weight | | | |
|---|---|---|---|---|---|
| | | Al₂O₃ | SiO₂ | ZrO₂ | CaO |
| 10 | 0.4 | 90 | 7 | Trace | 1 |
| 11-1 | 0.5 | 5 | 93 | Trace | 1 |
| 11-2 | 0.5 | Trace | 1 | 93 | 4 |

| Example | Sintered body density in g/cm³ | Sintered body bending strength in kg/mm² | Rate of impregnation with resin in % by volume | Friction coefficient |
|---|---|---|---|---|
| 10 | 2.3 | 6.7 | 62 | 0.16 to 0.28 |
| 11-1 | 1.52 | 6.3 | 43 | 0.18 to 0.24 |
| 11-2 | 3.18 | 8.1 | 45 | 0.19 to 0.24 |

| Example | Wear coefficient in mm/km (kgᶠ/cm²) |
|---|---|
| 10 | $3.7 \times 10^{-4}$ |
| 11-1 | $4.2 \times 10^{-4}$ |
| 11-2 | $3.2 \times 10^{-4}$ |

EXAMPLE 12

100 parts by weight of a silicon nitride powder of an average granule diameter of 0.4 μm were blended with 2 parts by weight of wax, 1 part by weight of polyethylene glycol, 0.5 part by weight of stearic acid and 100 parts by weight of benzene, were mixed within a ball mill for 5 hours and were then sprayed and dried. By the way, the above mentioned silicon nitride powder contained 21.5% by weight free silicon, 1.7% by weight oxygen, 1% by weight carbon, 0.07% by weight iron, 0.2% by weight aluminum and 0.03% by weight magnesium.

A proper amount of this dried material was taken and was molded under a pressure of 1.5 tons/cm² by using a pressing die made of a metal to obtain a product molding of a diameter of 50 mm, thickness of 20 mm and density of 1.95 g/cm³ (59% by volume).

The above mentioned product molding was put into a crucible made of graphite and was fired for 1 hour at a temperature of 1600° C. in a nitrogen gas atmosphere under the atmospheric pressure.

In the obtained sintered body, the crystals were bonded in a three-dimensional network structure, the density was 2.33 g/cm³ and the average bending strength was 16.5 kg/mm².

The same as in Example 10, this sintered body was made the fixed valve body 13 or movable vlave body 14 in which the porous body was impregnated with polytetrafluoroethylene in about 64% by volume of the air gaps. This fixed valve body 13 or movable valve body 14 had a very favorable sliding characteristic even when not lubricated and was confirmed to be very high also in the durability.

(Industrial Utilizability)

As detailed above, according to the present invention, there can be provided a valve characterized in that the sliding contact surface part of at least either of the fixed valve body 13 and movable valve body 14 is formed of a porous sintered ceramic body having open pores of a three-dimensional network structure and is charged with a lubricant in the above mentioned pores so that thereby, even when the fixed valve body 13 and movable valve body 14 are always in sliding contact with each other, the connecting and disconnecting operation will be able to be made always lightly and stably with the operating lever.

In the thus formed valve, not only the operation by the operating lever can be made lightly over a long period but also the fixed valve body and movable valve body 14 can be maintained in close sliding contact with each other to prevent the fluid from leaking out.

Needless to say, the above is the same even with a valve of any form made to connect and disconnect the passage of such other fluid than cold water and hot water as, for example, such fluid as such liquid as, for example, oil or such gas as propane gas.

Also, even in the case of an embodiment in which not only the sliding contact surface part of the fixed valve body 13 or movable valve body 14 is formed as described above but also the entirety of the fixed valve body 13 or movable valve body 14 is formed as mentioned above, the same effect will be able to be obtained.

What is claimed is:

1. A valve for regulating the flow of a fluid through an outlet passage, the valve comprising:
    a fixed valve body having a contacting face with a portion thereof defining an opening, said fixed valve body having means for conducting fluid from an inlet source through at least a portion of said fixed valve body and out said opening;
    a movable valve body disposed between said fixed valve body and the outlet passage, said movable valve body having a cooperating face with a portion thereof defining an opening, said cooperating face being positioned against, and movable along, said contacting face, said movable valve body having means for providing fluid communication between said cooperating face opening and the outlet passage, wherein at least one of said contacting face and said cooperating face is formed of a porous ceramic body having a three-dimensional network of open pores impregnated with a lubricant, said impregnated ceramic body presenting a sliding contact surface formed of said ceramic and said lubricant within pores in said ceramic to provide smooth sliding contact between said cooperating face and said contacting face wherein the smooth sliding contact friction remains stable during repeated movements of said cooperating face; and
    means for moving said cooperating face opening against said contacting face opening to provide fluid communication therebetween.

2. The valve for regulating the flow of a fluid through an outlet passage according to claim 1 wherein said sintered ceramic material is selected from the group consisting of $Al_2O_3$, $SiO_2$, $ZrO_2$, SiC, TiC, $B_4C$, WC, TaC, $Cr_3C_2$, $Si_3N_4$, BN, TiN, AlN, $TiB_2$, $CrB_2$ and mixtures thereof.

3. The valve for regulating the flow of a fluid through an outlet passage according to claim 1 wherein said lubricant is a resin selected from the group consisting of polyacetal resin, polyamide resin, polyethylene resin, polycarbonate resin, polybutylene terephthalate resin, styrene acrylonitrile resin, polypropylene resin, polyurethane resin, polyphenylene sulfide resin, epoxy resin, silicone resin, fluorine resin and mixtures thereof.

4. The valve for regulating the flow of a fluid through an outlet passage according to claim 1 wherein said lubricant is selected from the group consisting of fluoroethylene, fluoroester, fluorotriazine, perfluoropolyether, fluorosilicone and mixtures thereof.

5. The valve for regulating the flow of a fluid through an outlet passage according to claim 1 wherein said lubricant is selected from the group consisting of methylsilicone, methylphenylsilicone and mixtures thereof.

6. A valve for regulating the flow of a fluid through an outlet passage, the valve comprising:
    a fixed valve body having a contacting face with a first opening and a second opening spaced therefrom, said fixed valve body having a first means for conducting fluid from a first inlet source through at least a portion of said fixed valve body and out said first opening and second means for conducting fluid from a second inlet source through at least a portion of said fixed valve body and out said second opening;
    a movable valve body disposed between said fixed valve body and the outlet passage, said movable valve body having a cooperating face with an opening means for providing fluid communication with at least one of said first and second contacting face openings, said cooperating face being positioned against, and movable along, said contacting face, said removable valve body having means for providing fluid communication between said cooperating face opening means and the outlet passage, wherein at least one of said contacting face and said cooperating face is formed of a porous sintered ceramic body having a three-dimensional network of open pores impregnated with a lubricant, said impregnated ceramic body presenting a sliding contact surface formed of ceramic and said lubricant within pores in said ceramic to provide smooth sliding contact between said cooperating face and said contacting face, wherein the smooth sliding contact friction remains stable during repeated movement of said cooperation face; and
    means for moving said cooperation face opening means against at least one of said first and second contact face openings to provide fluid communication therebetween.

7. The valve for regulating the flow of a fluid through an outlet passage according to claim 6 wherein said sintered ceramic material is selected from the group consisting of $Al_2O_3$, $SiO_2$, $ZrO_2$, SiC, TiC, $B_4C$, WC, TaC, $Cr_3C_2$, $Si_3N_4$, BN, TiN, AlN, $TiB_2$, $CrB_2$ and mixtures thereof.

8. The valve for regulating the flow of a fluid through an outlet passage according to claim 6 wherein said lubricant is a resin selected from the group consisting of polyacetal resin, polyamide resin, polyethylene resin, polycarbonate resin, polybutylene terephthalate resin, styrene acrylonitrile resin, polypropylene resin, polyurethane resin, polyphenylene sulfide resin, epoxy resin, silicone resin, and fluorine resin and mixtures thereof.

9. The valve for regulating the flow of a fluid through an outlet passage according to claim 6 wherein said lubricant is selected from the group consisting of fluoroethylene, fluoroester, fluorotriazine, perfluoropolyether, fluorosilicone and mixtures thereof.

10. The valve for regulating the flow of a fluid through an outlet passage according to claim 6 wherein said lubricant is selected from the group consisting of methylsilicone, methylphenylsilicone and mixtures thereof.

* * * * *